United States Patent [19]
Razavi

[11] Patent Number: 5,914,289
[45] Date of Patent: Jun. 22, 1999

[54] SUPPORTED METALLOCENE-ALUMOXANE CATALYSTS FOR THE PREPARATION OF POLYETHYLENE HAVING A BROAD MONOMODAL MOLECULAR WEIGHT DISTRIBUTION

[75] Inventor: Abbas Razavi, Mons, Belgium

[73] Assignee: Fina Research, S.A., Feluy, Belgium

[21] Appl. No.: 08/797,800

[22] Filed: Feb. 7, 1997

[30] Foreign Application Priority Data

Feb. 19, 1996 [EP] European Pat. Off. ............ 96200422

[51] Int. Cl.⁶ .................. B01J 31/00; B01J 37/00; C08F 4/02; C08F 4/60
[52] U.S. Cl. .................. 502/107; 502/103; 502/117; 502/132; 526/160; 526/943
[58] Field of Search .................. 502/103, 117, 502/132, 107

[56] References Cited

U.S. PATENT DOCUMENTS

| | | | |
|---|---|---|---|
| 4,871,705 | 10/1989 | Hoel | 502/117 |
| 5,017,714 | 5/1991 | Welborn, Jr. | 502/117 |
| 5,036,034 | 7/1991 | Ewen | 502/117 |
| 5,234,878 | 8/1993 | Tsutsui et al. | 502/103 |
| 5,240,894 | 8/1993 | Burkhardt et al. | 502/108 |
| 5,276,208 | 1/1994 | Winter et al. | 502/117 |
| 5,594,081 | 1/1997 | Uchino et al. | 502/117 |

FOREIGN PATENT DOCUMENTS

| | | |
|---|---|---|
| 0347128 | 12/1989 | European Pat. Off. . |
| 0347129 | 12/1989 | European Pat. Off. . |
| 0598543 | 5/1994 | European Pat. Off. . |
| 0633272 | 1/1995 | European Pat. Off. . |
| 0676421 | 10/1995 | European Pat. Off. . |
| 9518836 | 7/1995 | WIPO . |

OTHER PUBLICATIONS

"Polymerization of Propene with Zirconocene–Containing Supported Catalysts Activated by Common Trialkylaluminiums", Soga et al., Makromolekulare Chemie, vol. 194, No. 6, pp. 1745–1755 (Jun. 1, 1993).

*Primary Examiner*—Mark L. Bell
*Assistant Examiner*—J. Pasterczyk

[57] ABSTRACT

The present invention relates to the production of high density polyethylene homopolymers or copolymers having a broad and monomodal molecular weight distribution wherein the polymerization process is conducted in the presence of supported metallocene-alumoxane catalysts wherein the metallocene is bridged, comprises at least a hydrogenated indenyl or fluorenyl and a metal M which may be Ti, Zr or Hf, wherein a plurality of conformers of the metallocene are formed and isolated on the support by reaction of the metallocene with the alumoxane and depositing the product formed on the support at a temperature in the range 85° C. to 110° C.

9 Claims, 2 Drawing Sheets

Mn–19704   Mp–78817   A–7458
Mw–145489  D –7.4
Mz–479164  D' –3.3

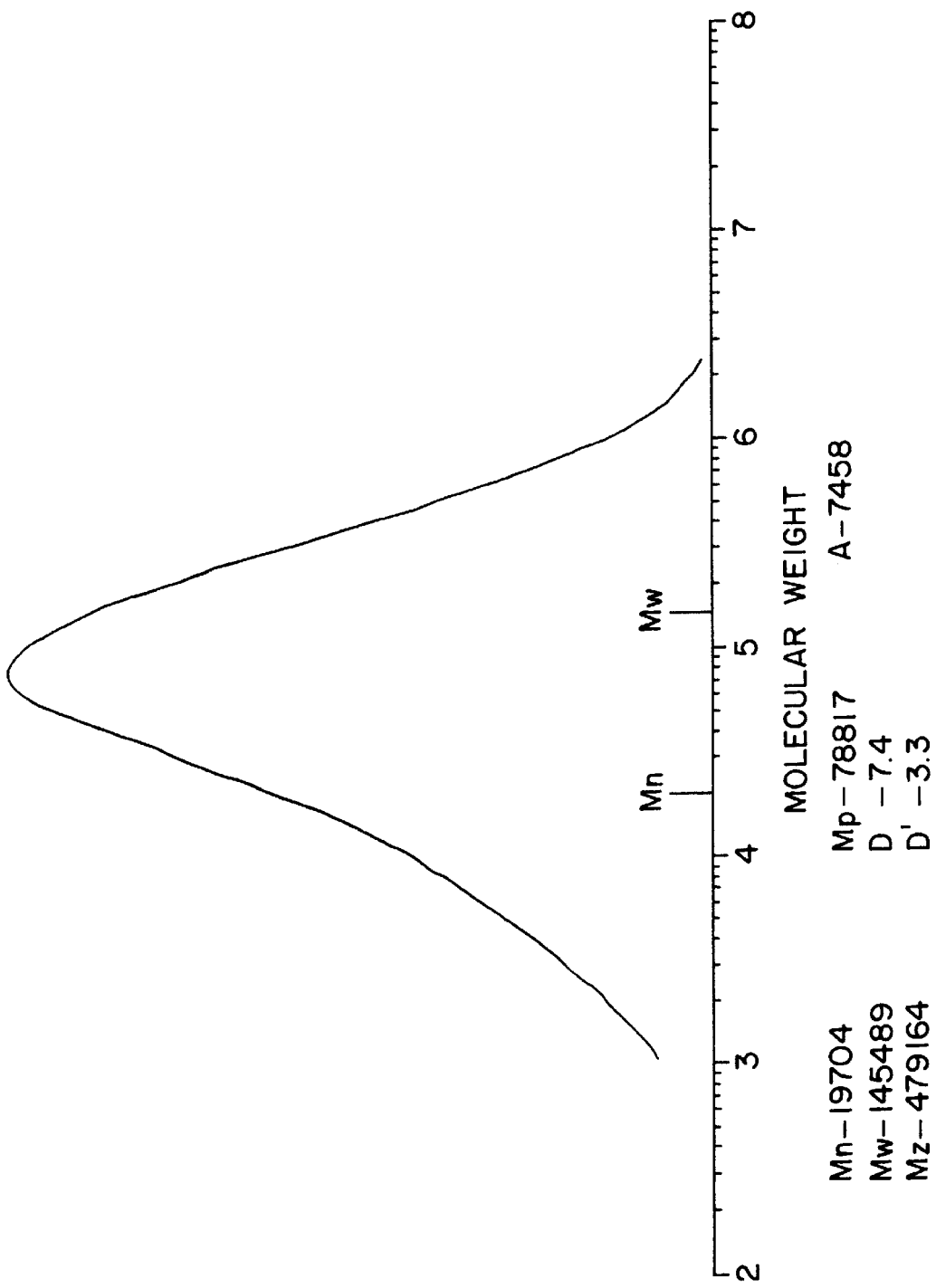

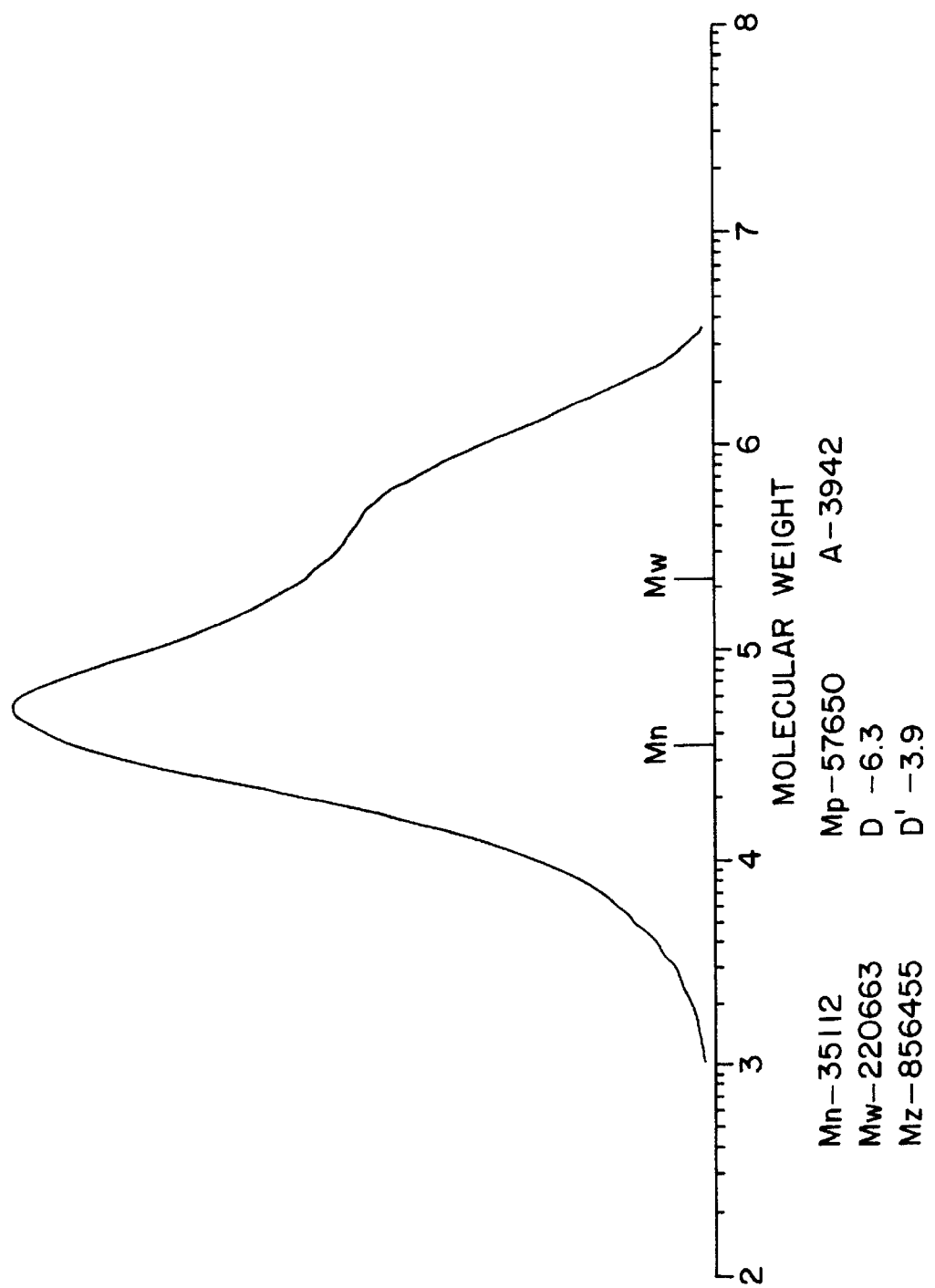

5,914,289

SUPPORTED METALLOCENE-ALUMOXANE CATALYSTS FOR THE PREPARATION OF POLYETHYLENE HAVING A BROAD MONOMODAL MOLECULAR WEIGHT DISTRIBUTION

BACKGROUND OF THE INVENTION

1. Field of the Invention

The present invention relates to new supported metallocene-alumoxane catalysts. More particularly, the present invention relates to the production of polyolefins, particularly of high density polyethylene homopolymers or copolymers, having a broad monomodal molecular weight distribution wherein the polymerization process is conducted in the presence of the new supported metallocene-alumoxane catalysts.

2. Description of the Prior Art

For polyolefins in general and high density polyethylene in particular, hereinafter referred to as polyethylene, the molecular weight distribution (MWD) is one of the basic properties that determines the properties of the polymer, and thus its end-uses.

Although it may be difficult to evaluate the influence of each property taken independently, it is generally accepted that the molecular weight mostly determines the mechanical properties while the molecular weight dispersion mostly determines the rheological properties.

There is a demand for high molecular weight polyethylene, because an increase of the molecular weight normally improves the physical properties of the resins. However, high molecular weights tend to make polymers harder to process. On the other hand, an increase in the MWD tends to improve the flowability at high shear rate during the processing. Thus, broadening the MWD is one way to improve the processing of high molecular weight (=low melt flow index) polyethylene, in applications requiring fast processing at fairly high die swell, such as in blowing and extrusion techniques.

It is generally believed that, in polyethylene having a high molecular weight combined with a broad MWD, the lower molecular weight portion aids in processing while the higher molecular weight portion contributes to the good impact resistance of the film, such polyethylene being processed at higher throughput rates with lower energy requirements.

The MWD may be described completely by the curve obtained by gel permeation chromatography. The MWD is generally described by a figure which is a good evaluation, also called the polydispersity index, representing the ratio of the weight average to the number average molecular weight.

There are several known methods of producing polyethylene having a broad and multimodal MWD; however, each method has its own disadvantages. Polyethylene having a multimodal MWD can be made by employing two distinct and separate catalysts in the same reactor each producing a polyethylene having a different MWD; however, catalyst feed rate is difficult to control and the polymer particles produced are not uniform in size and density, thus, segregation of the polymer during storage and transfer can produce non-homogeneous products. A polyethylene having a bimodal MWD can also be made by sequential polymerization in two separate reactors or blending polymers of different MWD during processing; however, both of these methods increase capital cost.

European Patent No 0128045 discloses a method of producing polyethylene having a broad molecular weight distribution and/or a multimodal MWD. The polyethylenes are obtained directly from a single polymerization process in the presence of a catalyst system comprising two or more metallocenes each having different propagation and termination rate constants, and aluminoxane.

It is interesting to note that the known methods of preparing broad molecular weight distribution polyolefins show a bimodal or multimodal MWD. Indeed, the gel permeation chromatograph curves show a more or less marked bimodal or multimodal MWD of the polyolefin. The MWD and shear rate ratios of the polymer and the catalyst activity disclosed in the known methods are rather low. Further the known metallocene catalyst systems for producing broad MWD use aluminoxane as cocatalyst during the polymerization which is not suitable for the slurry, bulk and gas phase processes and which causes severe fouling inside the reactor and renders the use of such a type of catalyst in continuous processes almost impossible.

SUMMARY OF THE INVENTION

The Applicants have unexpectedly found that it was possible to solve all these prior art problems. It is indeed an object of the present invention to provide a process for the polymerization of olefins, preferably for the homopolymerization or copolymerization of ethylene to form ethylene homopolymers or copolymers, having a broad molecular weight distribution with good processability, good physical properties and diverse applicability.

In accordance with the present invention, there is provided a supported metallocene-alumoxane catalyst for use in the preparation of polyolefins, preferably ethylene homopolymers and copolymers, having at the same time a broad and monomodal molecular weight distribution wherein the metallocene consists of a particular bridged meso or racemic stereoisomers, preferably the racemic stereoisomers.

In accordance with the present invention, polyethylene having a broad monomodal molecular weight distribution is prepared by contacting in a reaction mixture under polymerization conditions ethylene and a catalyst system comprising a supported metallocene-alumoxane catalyst characterized in that the metallocene consists of a particular bridged meso or racemic stereoisomer, preferably the racemic stereoisomers.

BRIEF DESCRIPTION OF THE DRAWINGS

A more complete appreciation of the invention and many of the attendant advantages thereof will be readily understood by reference to the following detailed description when considered in connection with the accompanying drawings wherein:

FIG. 1 is a Gel Permeation Chromatography graph corresponding to Example 1 of Table 2.

FIG. 2 is a Gel Permeation Chromatography graph corresponding to Example 2 of Table 2.

DETAILED DESCRIPTION OF THE INVENTION

The metallocenes used in the process of the present invention can be any of those known in the art as suitable for the (co)polymerization of olefins with the proviso that the metallocene is bridged, that it comprises at least a hydrogenated indenyl or fluorenyl and that it is isolated on its support under the form of all its conformers.

The preferred bridged metallocenes of the present invention can be selected from hydrogenated bisindenyl compounds having the following formula:

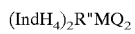

wherein Ind is an indenyl or a substituted indenyl, R" is a $C_1$–$C_4$ alkylene radical, a dialkyl germanium or silicon or siloxane, or an alkyl phosphinidine or imido group bridging the indenyls, Q is a hydrocarbyl radical such as aryl, alkyl, alkenyl, alkylaryl, or aryl alkyl radical having from 1–20 carbon atoms, hydrocarboxy radical having 1–20 carbon atoms or halogen and can be the same or different from each other, and M is Ti, Zr or Hf. Among these, ethylenebis(4,5,6,7-tetrahydro-1-indenyl) zirconium dichloride is the most preferred.

According to the present invention, the metallocene used in the catalyst system can be prepared by any known method. A preferred preparation method is described in an article of Hans H. Brintzinger published in the "Journal of Organometallic Chemistry", 288 (1985) p.63–67, which is incorporated herein by reference.

Any alumoxane known in the art can be used in the present invention. The preferred alumoxanes comprise oligomeric linear and/or cyclic alkyl alumoxanes represented by the formulae:

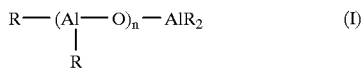

for oligomeric, linear alumoxanes and

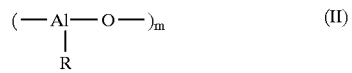

for oligomeric, cyclic alumoxanes,
wherein n is 1–40, preferably 10–20, m is 3–40, preferably 3–20 and R is a $C_1$–$C_8$ alkyl group and preferably methyl. Generally, in the preparation of alumoxanes from, for example, trimethyl aluminum and water, a mixture of line ar and cyclic compounds is obtained. Methylalumoxane is preferably used.

The alumoxane is usually delivered as a concentrated solution of alumoxane in toluene.

The support used in the process of the present invention can be any organic or inorganic solids, particularly porous supports such as talc, inorganic oxides, and resinous support materials such as polyolefin. Preferably, the support material is an inorganic oxide in its finely divided form.

Suitable inorganic oxide materials which are desirably employed in accordance with this invention include Group 2a, 3a, 4a or 4b metal oxides such as silica, alumina, and silica-alumina and mixtures thereof, silica being the most preferred one. Other inorganic oxides that may be employed either alone or in combination with the silica, alumina or silica-alumina are magnesia, titania, zirconia, and the like. Other suitable support materials, however, can be employed, for example, finely divided functionalized polyolefins such as finely divided polyethylene.

Preferably, the support is a silica having a surface area comprised between 200 and 600 $m^2$/g and a pore volume comprised between 0.5 and 3 ml/g.

According to the present invention, the catalyst system used in the process for producing polyethylene having a broad and monomodal molecular weight distribution can be made by any known method as long as the metallocene of the resulting supported metallocene-alumoxane catalyst is bridged, that it comprises at least a hydrogenated indenyl or fluorenyl and that it is isolated on its support under the form of all its conformers.

According to a preferred embodiment of the present invention, the supported metallocene-alumoxane catalyst is prepared as follows:

a) reacting a bridged metallocene stereoisomer comprising at least a hydrogenated indenyl or fluorenyl with an alumoxane at a temperature comprised between 15 and 50° C.

b) recovering from step a) a mixture of an alkylmetallocenium cation and an anionic alumoxane oligomer c) reacting the mixture from step b) with a support at a temperature comprised between 85 and 110° C.

d) recovering a supported metallocene-alumoxane catalyst as a free flowing catalyst wherein the metallocene stereoisomer is isolated on its support under the form of all its conformers.

The Applicants have unexpectedly found that the metallocenes of the present invention, which comprise bulky substituents (hydrogenated indenyl or fluorenyl), are present on the support in the form of all their conformers which exhibit considerable differences of energy barrier. Said conformers can be trapped in the alumoxane anionic cages and the steric restriction of said metallocenes prevents their interconversion. The presence of said isolated conformers on the support explains the production of a polyethylene having at the same time a broad and monomodal MWD when prepared with the catalyst system of the present invention.

According to the preferred catalyst preparation method, the reaction between the metallocene and the alumoxane is performed at a temperature comprised between 15 and 50° C., preferably about 25° C. This reaction is usually conducted in the presence of a solvent, preferably toluene.

The amount of alumoxane and metallocene usefully employed in the preparation of the solid support catalyst can vary over a wide range. Preferably, the aluminum to transition metal mole ratio is comprised between 1:1 and 100:1, preferably between 5:1 and 50:1.

The order of addition of the support to the mixture comprising the metallocene-alumoxane can be reversed. In accordance with a preferred embodiment of the present invention, the mixture metallocene-alumoxane is added to the support material slurried in a suitable hydrocarbon solvent.

Preferred solvents include mineral oils and the various hydrocarbons which are liquid at temperature and pressure conditions and which do not react with the individual ingredients. Illustrative examples of the useful solvents include the alkanes such as pentane, iso-pentane, hexane, heptane, octane and nonane; cycloalkanes such as cyclopentane and cyclohexane, and aromatics such as benzene, toluene, ethylbenzene, xylene and diethylbenzene, the preferred being toluene.

The reaction between the support and the mixture alumoxane-metallocene is conducted at a temperature comprised between 85 and 110° C., more preferably around 110° C.

An advantage of the preferred catalyst preparation method is the facility and rapidity with which the catalyst is prepared Indeed said preparation process does not require the time-consuming washing steps of the prior art; the final catalyst system is prepared within 1–2 hours. Further the present preparation method does not require the consumption of large amounts of solvent which is needed in prior art methods.

According to the present invention, there is also provided an improved process for the (co)polymerization of ethylene to produce a broad monomodal molecular weight distribution polyethylene characterized in that the polymerization is conducted in the presence of a supported metallocene-alumoxane catalyst according to the present invention.

The Applicants have unexpectedly found that the (co) polymerization of ethylene in the presence of a supported metallocene-alumoxane catalyst according to the present invention gives a polyethylene showing a broad monomodal molecular weight distribution.

The catalyst of the present invention can be used in gas, solution or slurry polymerizations. Preferably, according to the present invention, the polymerization process is conducted under slurry phase polymerization conditions. It is preferred that the slurry phase polymerization conditions comprise a temperature of about 20 to 125° C. and a pressure of about 0.1 to 5.6 MPa for a time between 10 minutes and 4 hours.

It is preferred that the polymerization reaction be run in a diluent at a temperature at which the polymer remains as a suspended solid in the diluent. Diluents include, for examples, isobutane, n-hexane, n-heptane, methylcyclohexane, n-pentane, n-butane, n-decane, cyclohexane and the like. The preferred diluent is isobutane.

According to a preferred embodiment of the present invention, a continuous reactor is used for conducting the polymerization. This continuous reactor is preferably a loop reactor. During the polymerization process, at least one monomer, the catalytic system and a diluent are flowed in admixture through the reactor.

While alumoxane can be used as cocatalyst, it is not necessary to use alumoxane as cocatalyst during the polymerization procedure for preparing polyolefins according to the process of the present invention. Further, the use of alumoxane as a cocatalyst during the polymerization may lead to the fouling of the reactor.

According to a preferred embodiment of the present invention, one or more aluminum alkyl represented by the formula $AlR_x$ are used wherein each R is the same or different and is selected from halides or from alkoxy or alkyl groups having from 1 to 12 carbon atoms and x is 3. Especially suitable aluminum alkyls are trialkylaluminums selected from trimethylaluminum, triethylaluminum, triisobutylaluminum, tri-n-octylaluminum or tri-n-hexylaluminum, the most preferred being triisobutylaluminum.

In accordance with the present invention the broadness of the molecular weight distribution and the average molecular weights can be controlled by the introduction of some amount of hydrogen during polymerization. Another preferred embodiment of the present invention implies the use of a comonomer for this control; examples of comonomer which can be used include 1-olefins butene, hexene, octene, 4-methyl-pentene, and the like, the most preferred being hexene.

According to the present invention when hydrogen is used it is preferred that the relative amounts of hydrogen and olefin introduced into the polymerization reactor be within the range of about 0.001 to 15 mole percent hydrogen and 99.999 to 85 mole percent olefin based on total hydrogen and olefin present, preferably about 0.2 to 3 mole percent hydrogen and 99.8 to 97 mole percent olefin.

The invention will now be further described by the following examples.

EXAMPLES

1. Catalyst Preparation

The support used is a silica having a total pore volume of 4.217 ml/g and a surface area of 322 m$^2$/g. This silica is further prepared by drying in high vacuum on a Schlenk line for three hours to remove the physically absorbed water. 5 g of this silica are suspended in 50 ml of toluene and placed in a round bottom flask equipped with magnetic stirrer, nitrogen inlet and dropping funnel.

An amount of 0.31 g of racemic metallocene is reacted with 25 ml of methylalumoxane (MAO 30 wt % in toluene) at a temperature of 25° C. during 10 minutes to give a solution mixture of the corresponding metallocenium cation and the anionic methylalumoxane oligomer.

Then the resulting solution comprising the metallocenium cation and the anionic methylalumoxane oligomer is added to the support under a nitrogen atmosphere via the dropping funnel which is replaced immediately after with a reflux condenser. The mixture is heated to 110° C. for 90 minutes. Then the reaction mixture is cooled down to room temperature, filtered under nitrogen and washed with toluene.

The catalyst obtained is then washed with pentane and dried under a mild vacuum.

The type of metallocene and the amount of catalyst obtained are given in Table 1 hereafter.

2. Polymerization Procedure

Three minutes before the introduction of the catalyst into the reaction zone 1 ml of 25 wt % of triisobutylaluminum (TIBAL) in toluene is added to the catalyst.

All polymerizations were performed in a four liters bench reactor. The reactor contained two liters of isobutane as diluent.

The catalyst type, the polymerization conditions and the polymer properties are given in Table 2 hereafter.

The polymers were analyzed by Gel Permeation Chromatography (GPC-WATERS MILLIPORE) and Differential Scanning Calorimetry (DSC). The graphs are given in FIGS. 1 and 2 (FIGS. 1 and 2 respectively correspond to examples 1 and 2 of table 2). "D" represents the ratio Mw/Mn (MWD), "D'" the ratio Mz/Mw and "A" the area under the curve.

TABLE 1

| Example | Silica (g) | Type (racemic) | Metallocene (g) | MAO (ml) | T (°C.) | Time (min) | Catalyst (g) |
|---|---|---|---|---|---|---|---|
| A1 | 5 | —(IndH$_4$)$_2$EtZrCl$_2$ | 0.31 | 25 | 110 | 90 | 8.2 |
| A2 | 5 | (Ind)$_2$EtZrCl$_2$ | 0.31 | 25 | 110 | 90 | 10 |
| A2 comparative | | | | | | | |

(IndH$_4$)$_2$EtZrCl$_2$ ethylenebis(4,5,6,7-tetrahydro-1-indenyl)zirconiumdichloride.
(Ind)$_2$EtZrCl$_2$ ethylenebis(indenyl)zirconiumdichloride.
In the two examples, the mixture alkylmetallocenium cation-anionic alumoxane oligomer has been added to the support material.

TABLE 2

| Example | Catalyst (mg) | Catalyst type | Pressure (MPa) | Polymerization T (°C.) | Polymerization Time (min) | Monomer Type | Monomer (wt %) | Hydrogen (Nl) | Hexene (wt %) | Activity (g/g · h) | Bulk (1) | MI (2) | HLMI (3) | MWD |
|---|---|---|---|---|---|---|---|---|---|---|---|---|---|---|
| 1 | 50 | A.1 | 2.2 | 70 | 60 | $C_2$ | 6 | 0.25 | 2.44 | 17280 | 0.25 | 0.08 | 7.77 | 7.4 |
| 2 (comp) | 100 | A.2 | 2.2 | 80 | 60 | $C_2$ | 6 | 0.25 | 2.44 | 10280 | 0.37 | 0.03 | 4.49 | 6.3 |

$C_2$ ethylene
(1) Bulk density (ASTM-D-1895)
(2) Melt Index (ASTM-D-1238-89A)
(3) High Load Melt Index (ASTM-D-1238-89A)

I claim:

1. A catalyst system comprising a metallocene-alumoxane catalyst for use in the preparation of polyolefins having a broad monomodal molecular weight distribution and a support for supporting the catalyst, wherein the metallocene comprises at least one hydrogenated indenyl or fluorenyl, a metal, and a bridge between (a) said at least one hydrogenated indenyl or fluorenyl and (b) another hydrogenated or non-hydrogenated indenyl or fluorenyl; and wherein a plurality of conformers of the metallocene are formed and isolated on the support by reaction of the metallocene with the alumoxane and depositing the product formed on the support at a temperature in the range of 85° C. t 110° C.

2. A catalyst system according to claim 1 further comprising a cocatalyst represented by the formula $AlR_3$, wherein each R is the same or different and is selected from the group consisting of halides and alkyl groups having from 1 to 12 carbon atoms.

3. A catalyst system according to claim 2 wherein the cocatalyst is trialkylaluminum selected from the group consisting of trimethylaluminum, triethylaluminum and triisobutylaluminum.

4. A catalyst system according to claim 1 wherein the bridged metallocene is selected from hydrogenated bisindenyl compounds having the following formula:

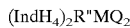

wherein Ind is an indenyl or a substituted indenyl, R' is a $C_1$–$C_4$ alkylene radical, a dialkyl germanium or silicon or siloxane, or an alkyl phosphinidine or imido group bridging the indenyls, each Q is a hydrocarbyl radical, a hydrocarboxy radical having 1–20 carbon atoms or halogen and can be the same or different from each other, and M is Ti, Zr or Hf.

5. A catalyst system according to claim 4 wherein the metallocene is ethylenebis (4,5,6,7-tetrahydro-1-indenyl) zirconium dichloride.

6. A catalyst system according to claim 1 wherein the metallocene comprises either only its racemic stereoisomers or only its meso stereoisomer.

7. A catalyst system according to claim 6 wherein the metallocene comprises only its racemic stereoisomers.

8. A catalyst system according to claim 4, wherein each Q is independently selected from the group consisting of aryl, alkyl alkenyl, alkylaryl and aryl radicals having 1–20 carbon atoms.

9. A catalyst system according to claim 3, wherein the trialkylaluminum is triisobutylaluminum.

* * * * *